F. LAMBERT.
YIELDING FASTENING FOR JOINTS.
APPLICATION FILED JULY 3, 1916.
1,229,623.
Patented June 12, 1917.
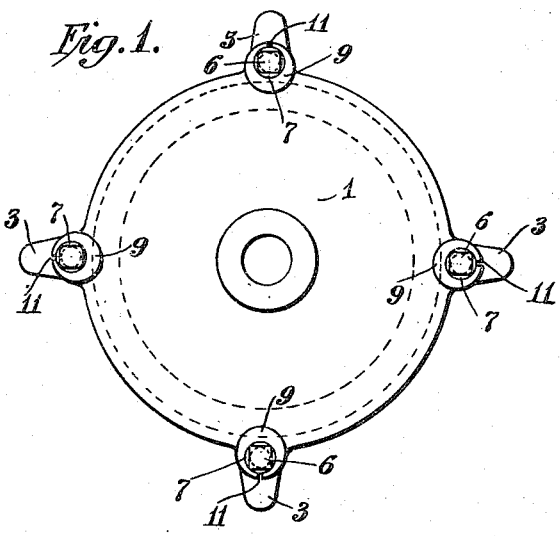
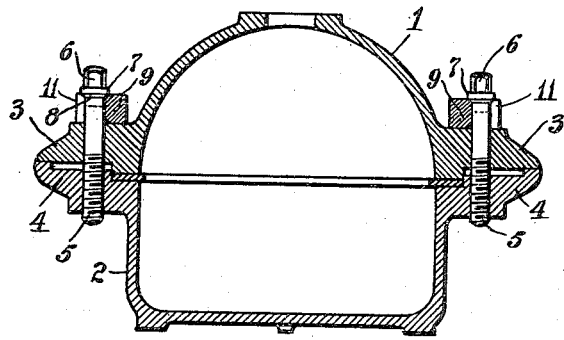
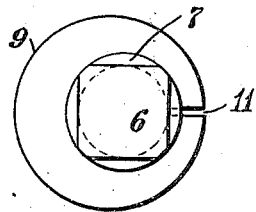
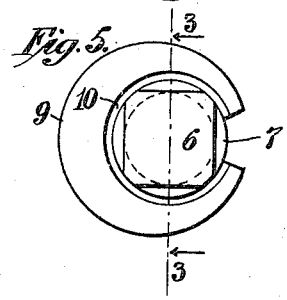
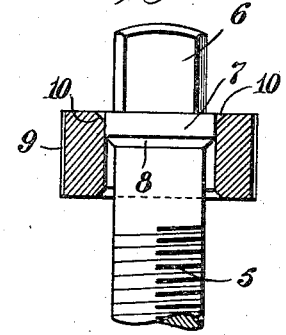
Attest:
by
Inventor:
Frank Lambert
Atty

UNITED STATES PATENT OFFICE.

FRANK LAMBERT, OF BROOKLYN, NEW YORK.

YIELDING FASTENING FOR JOINTS.

1,229,623.            Specification of Letters Patent.     Patented June 12, 1917.

Application filed July 3, 1916. Serial No. 107,224.

*To all whom it may concern:*

Be it known that I, FRANK LAMBERT, citizen of the United States of America, and a resident of Brooklyn, county of Kings, and State of New York, have invented certain new and useful Improvements in Yielding Fastenings for Joints, of which the following is a specification.

My invention relates to improvements in yielding fastenings for joints, for example, the joint between the members of a water-meter casing, and embodies improvements upon the device for a similar purpose illustrated and described in my Patent No. 1,155,664 dated October 5, 1915. In the said patent I have shown the members of a meter casing held together by headed bolts, there being beneath the head of each said bolt a yield member weakened at one or more points to facilitate yielding of such yield member under excessive pressure; and one particular construction of yield member illustrated in said patent comprises a split washer having a tapered bore adapted to coact with a tapered surface of the bolt.

According to my present invention I employ, as a yielding member, a split washer, the sides of which are of progressively increasing strength or stiffness from the slot or gap of the washer backward; a construction which is most easily obtained by so making the washer that its bore or central opening is eccentric to the washer as a whole. The head of the bolt to coact with the yielding member is preferably made so that after the washer has expanded to a predetermined degree, the head of the bolt will enter the bore of the washer and such washer may then pass completely over such head if necessary. This latter construction limits the degree of opening of the split washer, and in practice the design is such that the washer is not unduly expanded by being opened sufficiently to pass over the head of the bolt, and may therefore be reused.

My invention consists, therefore, in the novel construction of the yield member or split washer and in the novel correlation of the washer and bolt.

The objects of my invention are to improve the construction of joint fastenings of the type referred to, to limit to a predetermined degree the pressure required to completely open the meter casing, to reduce the amount of metal required for such fastenings and therefore to reduce the cost, and to avoid destruction of the yield member when the latter is opened as a result of excessive pressure.

I will now proceed to describe my invention with reference to the accompanying drawings, and will then point out the novel features in claims.

In said drawings:

Figure 1 shows a top view of a meter casing having a joint provided with yielding fastenings embodying my invention;

Fig. 2 shows a central vertical section of the said meter casing.

Fig. 3 shows, on a larger scale than the previous figures, an axial section of the washer, the section being taken on the line 3—3 of Fig. 5, the view also showing the head of the coacting bolt or stud within the bore of the washer.

Fig. 4 is a top view of the said washer and bolt, the washer being shown in the condition of normal expansion only; and Fig. 5 is a top view of the same parts, showing the washer expanded to permit it to pass over the head of the bolt or stud.

In the drawings, 1 designates the upper section of a meter casing, and 2 the lower section thereof. These sections are provided, at suitable points around their periphery with registering lugs, 3 and 4, bored for the reception of fastening screws or studs or bolts 5; the screw holes of the lower lugs being tapped to receive these screws. Each screw is provided, in the construction shown, with a polygonal-shaped head and with a collar 7 of slightly greater diameter than the body of the screw, and having a tapering lower surface 8.

Split washers, 9, constituting yield members, are interposed between the collar 7 of the screws 5 and the tops of the upper lugs 3. Such split washers are provided on their upper surfaces, with tapering surfaces 10 preferably corresponding in angle to the tapering surface 8 of the screw shoulder 7. These washers or yield members are formed of some material, such for example as brass, capable of some flexure, without breakage. As made, ready for use, the gap 11 of each washer will be nearly closed. When the screws 5 are turned down, incident to the normal closing and tightening of the joint between the meter sections 1 and 2, the gap 11 of each washer will be opened slightly, and in practice each screw will be turned down until such gap 11 is opened to some predetermined degree; the degree of opening of the gap showing the pressure exerted by means of the screw upon the joint between the sections of the meter casing.

If now the meter casing be subjected to some excessive internal pressure, such, for example, as may be due to the freezing of the liquid within the casing, and being a pressure such that it is desired that the joint between the sections of the meter casing shall yield: split washers or yield members 9 will yield or open wider to this excessive pressure, so permitting opening of the joint between the sections of the meter casing; and, if the pressure continue to a sufficient degree after this slight opening of the meter casing, the yield members may open sufficiently to permit them to pass over the shoulders 7 of the screws 5, as indicated in Fig. 3, thus permitting a wider opening of the joint between the sections of the meter casing, and a complete relief of the pressure within that meter casing; the pressure to which the meter casing may be subjected in practice being thereby limited to a predetermined pressure. Owing to the fact that the collar 7 is of only slightly greater diameter than the body of the screw, 5, and that the head 6 of the nut is of no greater diameter than this collar 7, the degree of opening or expansion of the washer 9 is limited, and in practice, such washer is not expanded to such an extent as to cause its rupture or to prevent it being closed again for reuse after being so expanded. In the construction of my said prior patent, however, continued expanding of the washer opens the washer so widely that the washer is weakened and is apt to break if attempt be made to close it for reuse.

As already explained, and as shown in the drawings, the central opening or bore of the washer is eccentric to the washer as a whole, the sides of the washer being thinnest near the gap 11, and growing progressively thicker backward or to the part of the washer opposite such gap. It will be apparent that a washer so constructed is, for equal mass and quality of material, stronger than a slit washer having a concentric bore. In other words, by making the washer with an eccentric bore, or by making it in any other way so that its walls increase in thickness from near the gap backward, I am able to use a washer having less material in it, and which therefore is cheaper, than a washer of equal strength having a concentric bore. As these washers are commonly made of brass, which is, relatively, an expensive material, this reduction in amount of material required for the washer is of importance. Likewise the form of screw shown herein, viz., a screw having a collar 7 of slightly greater diameter than the body of the screw, and having a head 6 of less diameter than the collar, is a cheaper construction than the form of screw shown in my said prior patent; and this is of importance in view of the fact that such screws are commonly turned down from brass or bronze rods, both of which are relatively expensive metals.

Preferably the washers 9 are provided with beveled surfaces 10 on both sides. The beveled surfaces 8 of the screws 5 may be of different angles to suit the resistance the meter casing has to withstand under normal conditions. That is to say, the bolt 5 may be made with beveled surfaces 8 of either forty-five degree angle or sixty degree angle, or other desired angle, according to the conditions.

Because, once the cylindrical portion of the collar 7 of the bolt has entered the cylindrical portion of the bore of the washer, resistance to upward motion of the upper section of the meter casing is practically relieved, the pressure within the meter casing is also relieved. Such pressure is commonly due to freezing of the contents of the meter casing. Once the collar 9 has opened sufficiently to pass over the head of the screw, further freezing of the contents of the meter casing can merely cause further rise of the upper section 1 of the casing without the exertion of any great pressure on the meter casing.

What I claim is:

1. The combination with two joint members, of means for connecting said members comprising screws provided with collars having substantially cylindrical sides and taper lower surfaces, and having heads upon such collars of no greater diameter than such collars; and a split washer beneath each such collar having a bore initially smaller than the diameter of such collar.

2. The combination with two joint members, of means for connecting said members comprising a screw and a split washer, the screw provided with an enlargement engaging one surface of the washer, the washer having a bore which is eccentric to the washer as a whole, such bore being of a less diameter than the maximum diameter of said enlargement of the screw, the engaging surfaces of the said washer and enlargement of the screw so formed relatively that separation of the two joint members relatively causes the washer to spread and to ride on, and, if the separation continue far enough, ride over, the said enlargement of the screw.

3. A yield member for joints comprising a split washer, the sides of which increase progressively in strength from the gap of the washer backward.

4. A yield member for joints comprising a split washer, the sides of which increase progressively in width from the gap of the washer backward.

5. A yield member for joints comprising a split washer the sides of which are of less strength near the gap of the washer than elsewhere.

6. The combination with two joint members, of means for connecting said members comprising a screw provided with a head and with a collar beneath such head, of a diameter not less than the greatest diameter of such head, and a split washer beneath such collar and having a bore initially smaller than the diameter of such collar, the diameter of such collar being only slightly greater than the initial diameter of the bore of such washer, whereby expansion of the washer due to excessive pressure causes the washer to pass over the collar, the expansion of the washer ceasing when it begins to pass over the collar, the expansion of the washer being thereby limited to a predetermined degree, and being limited to below the point of rupture of such collar by reason of the slight excess of diameter of the collar over the diameter of the bore of the washer.

In testimony whereof I have signed this specification in the presence of two subscribing witnesses.

FRANK LAMBERT.

Witnesses:
H. M. MARBLE,
PAUL H. FRANKE.

Copies of this patent may be obtained for five cents each, by addressing the "Commissioner of Patents, Washington, D. C."